United States Patent
van Wijk et al.

(10) Patent No.: US 10,633,046 B2
(45) Date of Patent: Apr. 28, 2020

(54) STEERING ARRANGEMENT FOR TILTABLE VEHICLE

(71) Applicant: KERV AUTOMOTIVE N.V., Houthalen-Helchteren (BE)

(72) Inventors: Elias van Wijk, Houthalen-Helchteren (BE); Arjan Voorbij, Houthalen-Helchteren (BE)

(73) Assignee: KERV AUTOMOTIVE N.V., Houthalen-Helchteren (BE)

(*) Notice: Subject to any disclaimer, the term of this patent is extended or adjusted under 35 U.S.C. 154(b) by 122 days.

(21) Appl. No.: 15/745,891

(22) PCT Filed: Jul. 20, 2016

(86) PCT No.: PCT/EP2016/067318
§ 371 (c)(1),
(2) Date: Jan. 18, 2018

(87) PCT Pub. No.: WO2017/013178
PCT Pub. Date: Jan. 26, 2017

(65) Prior Publication Data
US 2018/0208259 A1   Jul. 26, 2018

(30) Foreign Application Priority Data

Jul. 20, 2015 (NL) ...................................... 2015193

(51) Int. Cl.
*B62D 61/08* (2006.01)
*B62D 9/02* (2006.01)
(Continued)

(52) U.S. Cl.
CPC .............. *B62D 61/08* (2013.01); *B62D 3/12* (2013.01); *B62D 7/06* (2013.01); *B62D 9/02* (2013.01);
(Continued)

(58) Field of Classification Search
CPC ........ B62D 61/08; B62D 9/02; B62D 5/0457; B62K 5/10
See application file for complete search history.

(56) References Cited

U.S. PATENT DOCUMENTS 6,328,125 B1 * 12/2001 Van Den Brink ........................... B60G 17/0162
180/211
7,647,999 B2 * 1/2010 Geiser .............. B60G 17/01908
180/210
(Continued)

FOREIGN PATENT DOCUMENTS

WO   2014022315   2/2014

*Primary Examiner* — Faye M Fleming
(74) *Attorney, Agent, or Firm* — Preti Flaherty Beliveau & Pachios LLP (57) ABSTRACT

A front frame is provided with a seat for at least one person and a front wheel mounting for at least one front wheel; and a back frame provided with a rear wheel mounting for at least two back wheels. The front frame is connected via a rotary axis with the back frame, the rotary axis having a component parallel to the longitudinal direction of the vehicle. A drive arrangement engages on at least one of the wheels; a steering arrangement is arranged for rotating at least one front wheel relative to the front frame, over a rotation axis with a vertical component. The rear wheel mounting comprises rotatable mounting members for mounting the rear wheels, the mounting members rotatable over a rotation axis with a vertical component, wherein one or more rear wheel steering actuators drive the mounting members. A tilt actuator controls the tilt position of the front frame relative to the rear frame, which is independent of the steering actuation of the rear wheel steer actuator.

17 Claims, 4 Drawing Sheets

(51) Int. Cl.
*B62K 5/10* (2013.01)
*B62K 5/027* (2013.01)
*B62D 3/12* (2006.01)
*B62D 7/06* (2006.01)
*B62D 9/04* (2006.01)
*B62D 11/00* (2006.01)
*B62D 12/00* (2006.01)
*B62J 99/00* (2020.01)

(52) U.S. Cl.
CPC .............. *B62D 9/04* (2013.01); *B62D 11/003* (2013.01); *B62D 12/00* (2013.01); *B62K 5/027* (2013.01); *B62K 5/10* (2013.01); *B62J 2099/002* (2013.01)

(56) References Cited

U.S. PATENT DOCUMENTS

| | | | |
|---|---|---|---|
| 8,249,775 B2* | 8/2012 | Van Den Brink | B62K 5/10 180/210 |
| 2014/0019006 A1 | 1/2014 | Bruce | |
| 2018/0134336 A1* | 5/2018 | Yoshino | B62K 5/05 |
| 2018/0148118 A1* | 5/2018 | Horiguchi | B62K 5/027 |

* cited by examiner

STEERING ARRANGEMENT FOR TILTABLE VEHICLE

The invention relates to a vehicle comprising a frame with one or more seats for persons; two rear wheels and at least one front wheel, a drive arrangement that engages on at least one of the wheels; a steering arrangement for turning the front wheel; and a mounting arrangement for mounting the rear wheels.

Such vehicles are known as three or four wheelers and can be motorized. Advantageously the vehicles are of a tiltable nature, with a rear frame with rear mounting for at least two rear wheels connected via a rotary shaft to a front frame, wherein the shaft has an axis in the longitudinal direction of the vehicle. Such tiltable mounting improves driving experience and comfort, because the cabin can be rotated over a rotation axis, so that the seat can be aimed at a momentary acceleration component, mainly in corners. In particular, it is known that it is advantageous that the rear wheels co steer in the same direction as the steering direction of the front wheel, especially at higher speeds, to improve the driving stability. A disadvantage of the known arrangements is that under steer effects can be augmented by co steering of the rear wheels at lower speeds. For example, by taking a curve a risk on inclining or even tipping over is substantial, so that it is necessary as a driver to shift the center of gravity by leaning against the curve, which is uncomfortable and requires a very active and aware posture. Tipping over can also be the consequence in no arrangements of understeer effect and occurs mainly at higher speed, for example higher than 80 km/h, so that one or more front wheels can slip away while taking a curve, with the consequence that a desired curve cannot be made. Steering corrections by a driver to neutralize understeer effects can lead to tipping over of the vehicle. A further disadvantage of the known arrangement is that mainly at lower speeds, in particular speeds between 0 to 30 km/h, in particular during maneuvering and parking it is impossible to provide for a small turning circle. At speeds between about 30 to 80 km/h the known arrangements can be experienced as instable during steering in combination with tilting of a front frame and/or a tilting cabin. This instability can for example be caused when the degree of steering does not correspond well to the tilting behavior of the front frame and/or tilt cabin at a certain speed. Furthermore there can be a matter of limited maneuverability, for example during lane change, and there is also a chance on understeer effects that occur with higher lateral accelerations, for example when the front frame tilts in the direction of the steering direction.

The invention aims to overcome certain disadvantages or to reduce these and provides in a vehicle that has a compact wheel basis and can drive through a curve with increased safety.

This aim can be achieved by a vehicle of the above mentioned kind, wherein a front frame is provided with a seat for at least one person and a front wheel mounting for at least one front wheel; and a back frame provided with a rear wheel mounting for at least two back wheels. The front frame is connected via a rotary axis with the back frame, the rotary axis having a component parallel to the longitudinal direction of the vehicle. A drive arrangement engages on at least one of the wheels; a steering arrangement is arranged for rotating at least one front wheel relative to the front frame, over a rotation axis with a vertical component. The rear wheel mounting comprises rotatable mounting supports for mounting the rear wheels, the mounting supports rotatable over a rotation axis with a vertical component, wherein one or more rear wheel steering actuators drive the mounting supports. A tilt actuator controls the tilt position of the front frame relative to the rear frame, which is independent of the steering actuation of the rear wheel steer actuator.

A hand steering device, such as a hand wheel, joystick preferably has a direct mechanical link with only the front wheels. This arrangement has an advantage that the rear wheels can be controlled separately, so that improved steering behavior and a safer steering of the vehicle can be realized. The invention preferably comprises an electrical controller provided in the frame for example on the rear frame or on the rear wheel mounting wherein the electrical controller is configured to receive electronic measure signals on a more measure devices and use these measure signals to actuate the rear wheel steering actuators.

Actuating the vehicles with an electronic controller has an advantage that one or more measurement signals can be used for actuating the rear wheels so that for various driving situations the most safe actuation of the rear wheel steering actuators can be obtained. These measurement signals can comprise information of the vehicle and/or of the surroundings.

Information of the vehicle is not limited to example vehicle speed, vehicle direction, steering angle, steering force, counter steer feedback, rotation around a vertical axis of the vehicle, a rear wheel steer actuator position, rear wheel steering force, and/or tilting of the front frame.

Additional information of the surroundings is not limited to for example the condition of the road, angle of the road with respect to the horizon, weather conditions, traffic signs or obstacles.

The invention comprises preferably a method for steering, a tilt vehicle, wherein a tilt actuator controls the rotary position of a tiltable front frame respective to a non tiltable back frame, which is independent of the steering action of the rear wheel steer actuator. In a first aspect the method comprises setting of one or more of the measurement devices for receiving traffic and/or surroundings information. In a second aspect an electrical controller receives via measurement devices certain vehicle and/or surroundings information. In a third aspect the electrical controller can generate based on the received information generate and transmit a steering signal to control one or more rear wheel steer actuators of a rear wheel mounting in the rear frame. In a fourth aspect the rear wheel steer actuators can be actuated based on the received steer signal. This method has as an advantage that the rear wheels can be controlled separately, so that an improved method for steering behavior and safer steering of the vehicle can be realized. In an embodiment, the controller controls behavior of the tiltable vehicle in different ways at different speeds and/or at certain external conditions, for example the weather conditions and the road conditions.

In an aspect, rear wheel steering is performed based on measured lateral acceleration. To this end the electrical controller is programmed to optimize rear wheel steering due to lateral acceleration in regular driving situations irrespective to cabin tilting. When exceeding normal driving conditions the control unit will terminate rear wheel steering actuation due to safety reasons in controlling the vehicle. These situations might occur e.g. losing grip over rear of front wheels resulting in sidewards slip (e.g. drifting). In particular, the electronic controller can be programmed to distribute measured torques according to an axle load distribution and the steering angle. By such distribution active differential is provided that coordinated with individual brakes. In an embodiment, the electronic controller controls a locking ratio of the rear differential while braking the inner wheel. This may result in an increase of torque of the outer wheel. The torque difference between the outer wheel and the inner wheel creates a yaw moment.

Invention will be further explained while referring to the drawing herein.

In the drawings the same or similar parts are indicated with the corresponding reference numerals.

Figure 1:
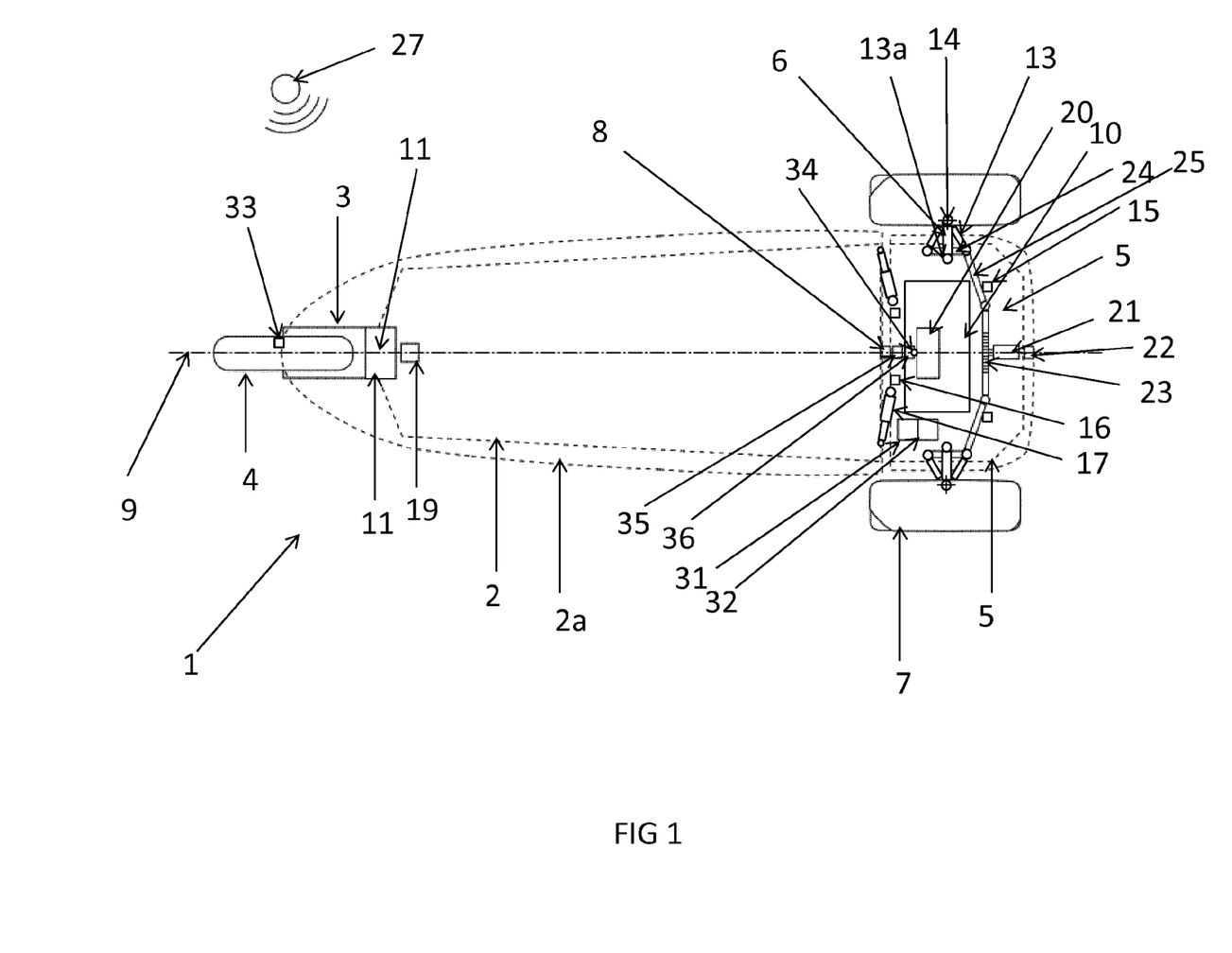
FIG. 1 shows a schematic plan of view of a vehicle according to the invention.

In FIG. 1 an embodiment is shown of a schematic plan of view of a vehicle according to the invention. Vehicle 1 comprises a front frame 2 with the seats (not displayed) for at least a person and a front wheel mounting 3 for at least one front wheel 4. Back frame 5 is shown with a rear wheel mounting 6 for at least two rear wheels 7. Front frame 2 is connected via a rotation axis 8 for example with a mount, to the rear frame 5, which rotation axis 8 has an parallel component with the longitudinal direction 9 of vehicle 1. A drive arrangement 10 is provided to engage at least on one of the wheels 7, wherein the drive arrangement can comprise a fuel engine or at least one electrical engine.

A steer arrangement 11 is provided for turning at least one front wheel relative to the front frame 2, over a front axis 12 with a vertical component. The rear wheel mounting comprises rotatable members 13 for mounting the rear wheels 7, which mounting members 13 rotate over a rotation axis 14 with a vertical component. 13a, One or more rear wheel actuators 15 drive the mounting members 13. A tilt actuator 16 controls the rotary position of the front frame relative to the rear frame, which is independent of the steering action of the rear wheel steer actuator 15. The tilt actuator 16 can be for example carried out in an electronic, hydraulic or electrohydraulic form.

Figure 2:
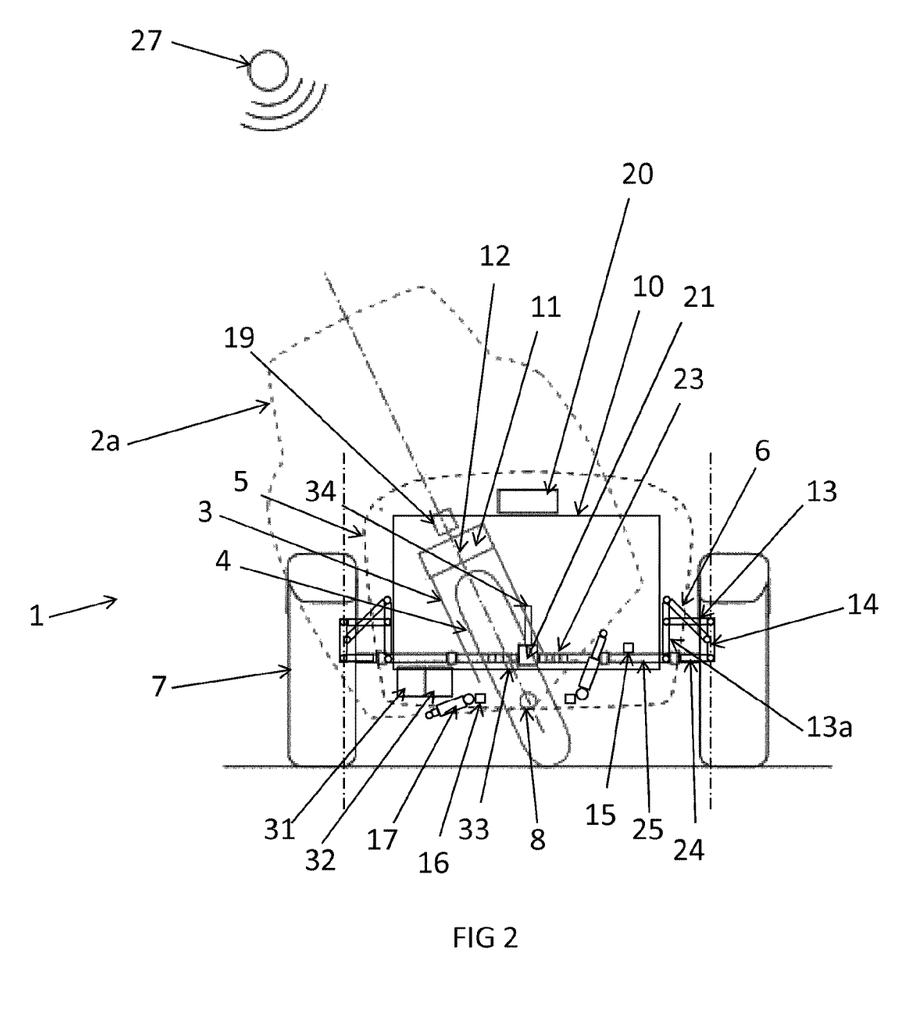
FIG. 2 shows a schematic rear view of a vehicle according to the invention.

In FIG. 2 an embodiment is shown of a schematic rear view of a vehicle according to the invention. In a preferred embodiment as shown in FIGS. 1 and 2, the tilt actuator 16 comprises at least a hydraulic cylinder 17, where, in the shown example, the front frame 2 at least comprises an arm (not shown) that engages on the hydraulic cylinder, which arms controls the rotary position of the front frame 2 relative to the rear frame 5. In an alternative preferred embodiment as shown the tilt actuator comprises an electromotor (not shown) that is comprised in the rotary shaft of the front frame, e.g. in the form of an circumferential bearing that can be rotated via linear actuators comprised in the bearing.

This embodiment has the advantage that tilting can be more effective.

Preferably the tilt actuator 15 is connected to one or more measurement devices 18 that are configured to detect and register vehicle and/or surroundings information, for example a vehicle speed sensor, that matches a stiffness characteristic of the tilt actuator to the vehicle speed. Measurement devices 18 can be further configured to detect vehicle information in the form of for example vehicle direction, for example rearward or advancing direction, lateral acceleration of the vehicle 1, rotation round the vertical axis of the vehicle one or yaw rate, steering direction, steering force, tire pressure, rear wheel steering angle and/or tilt angle of the front frame of a cabin 2a that is mounted thereon. For example FIG. 1 shows a force sensor 19 for measuring a steering force (torque), steering direction (angle) and angular velocity or steering speed. Also surrounding information for example vehicle location, road condition, obstacles on the road, traffic lights or other vehicles on the road can be measured by corresponding measurement devices for input in the electronic controller 20. For detecting vehicle information and/or surroundings information various measurement orders can be applied not limited to for example sensors, camera's, satellites etcetera. The information that is collected by the measurements is converted by electronic controller 20 in signals to control one or more tilt actuators 15. In this way front frame 2 is tilted by tilt actuators in a certain position and direction relative to the tilt frame, is kept straight or retrieved in an upward position. For example this can be the case when a vehicle safe condition is applied, for example when a controller detects that electronics are failing. A fail safe circuit is provided to this end to ensure minimal functioning of the controller.

For example, tilt actuator 15 comprises an oscillation detection circuit (not shown) wherein an active damping can be applied relative to oscillation detection. When certain situations occur for example when rear wheel steering cannot be applied for safety reasons, this can lead to oscillations in the vehicle and/or cabin. These oscillations can then be cancelled by increased stiffness characteristics and/or active damping.

The rear wheel steer actuators 15 in an alternative embodiment comprise at least one hydraulic cylinder (not shown) or for example an electrical gear arrangement 18 for example with a toothed rack organ 21 as shown in FIGS. 1 and 2, which engages on an arm of at least one of the mounting members 13, which arm controls the rotary position of mounting organ 13. FIGS. 1 and 2 show that an electro motor 21 with a mount 22 is mounted in the rear frame 5, wherein the electromotor is configured to drive a tooth wheel of the tooth wheel rack organ 21. The hydraulic cylinders (not shown) of tooth will arrangement 20 can be connected in antiparallel to distinct mount members 13, wherein the arms then 24 of the mount members 13 are coupled via a link assembly 25. In this way rear wheels 7 can rotate to left right or in a position straight ahead. In certain drive situations the rear wheel steer actuators 15 can be fixed due to safety in a neutral position, that is to say that the wheels are parallel to a longitudinal axis 6 of vehicle 1. As shown in FIGS. 1 and 2 rear steer wheel actuators 15 can comprise an electromotor 26, that is mounted in the rotary axis of the mounting members 13. Electromotor 25 can be additionally provided with a measurement device 18 for detecting a position of the wheels 7. This information can be used by electric controller 20 to control one or more directions of the vehicle 1.

FIG. 1 further shows that in the front frame 5 a steering arrangement 11 with a shaft that is substantially parallel to a rotary axis 14 of the mounting members 13, which steering axis tilts along with the tilt movement of the front frame and/or cabin 2a on the front frame 2, which steering axis (not shown) is connected to a transmission device for transmitting the rotary position of the steering axis to the turning of one or more front wheels 4.

The device can be provided by one or more measurement devices that are configured to register vehicle information and/or surroundings information. Surroundings information can for example concern the condition of the road angle of the road relative to the horizon, weather conditions, traffic signs or obstacles. This information can be detected via various types of measurement devices, for example by sensors that are configured in the vehicle to receive surroundings information of for example other vehicle or satellite 27. Surroundings information can for example also be provided by a camera that is connected to the vehicle that can measure for example the condition of the road, weather conditions, obstacles or for example traffic light information.

Figure 3:
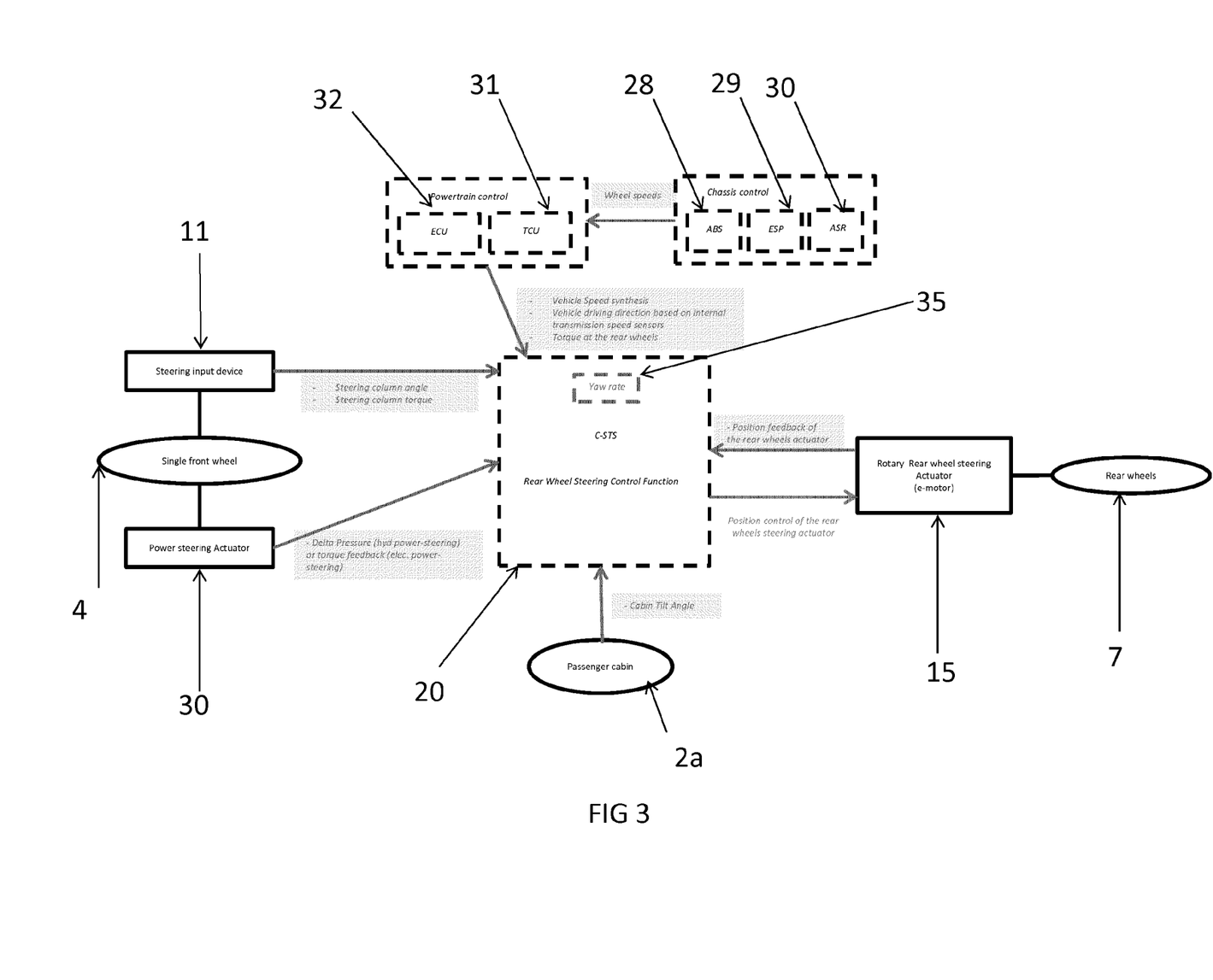
FIG. 3 shows a schematic depicting the electronic controller for controlling the rear wheels.

FIG. 3 schematically shows a display of the electrical controller 20 according to the invention. Electrical controller 20 is provided in vehicle 1, for example on the rear frame 5, wherein the electronic controller is configured to received measurement signals of one or more measurement devices 18 and use these measurement signals on the rear wheel steer actuators 15.

Vehicle information that preferably is used by a controlling rear wheel steering can be for example vehicle speed that is measured by an ABS antiblock arrangements 28, ESR traction control device 29, ASP stability control device 30 or an electrical controller of a drive arrangement. The traction control provides in individual braking independently driver braking. In this way a stability around the vertical vehicle axis can be provided. Furthermore the vehicle direction for example advancing or rear ward direction can be measured by electronic controller 31 of drive arrangement or by electronic controller of sensors 32 in a transmission direction, steering angle or steering force that is initiated by the driver of the vehicle can be measured by for example a sensor 19 in the steering column or in the front wheel mounting. Steering force feedback, also called power steering feedback, is measured by actuators 33 in the front wheel mounting that provides counter steering action on the steering arrangement 11 independent of the level of force on the steering arrangement 11 by the driver. A measured power steering feedback is also a reference for the rear wheel steering but provision of counter steering can also be seen as an independent invention, wherein counter steer is provided based on vehicle speed, vehicle direction, steering angle, steering arrangement 11 such as a steer wheel, rear steer wheel angle and tilt of the front frame of cabin 2a. For controlling the rear wheel steering also the level of rotation around vertical axis 34 of the vehicle is an important measure, with yaw hook sensor 35, for controlling the rear wheel steering. The sensor 35 can be arranged in the rear wheel mount 6, preferably as close as possible to the setup gravity of the vehicle. By this sensor the real measured rotation relative to vertical axis 34 of the vehicle can be compared with an optimal rotation, so that over or under steer conditions can be detected. In this way electronic controller can initiate corrective steering of the rear wheels 7. Position of the rear wheel steer actuators 15 can be measured, so that the rear wheel steering angle can be determined and the rear wheel tor can be detected by electronic controller of the drive and transmission control. In addition the tilt angle or lateral acceleration of the tilt of the front frame 2 and/or cabin 2a an important measure that can be measured by tilt sensor 36. These and other measurements are sent by the measurement devices 18 to electronic controller 20 wherein electronic controller 20 subsequently transmits a steering a control signal to the rear steer actuators 15, so that the rear wheel 7 can be controlled. All measurements by measurement devices 18 can be processed by controller 20 so that the rear wheels 7 can be controlled at various driving speeds, driving behavior, driving surroundings and conditions in an optimal way, so that driving of the vehicle can be carried out in a safe and stable way. Since the electronic controller can receive vehicle reference information and surroundings information where the vehicle is located during driving electronic controller 20 can control the rear wheel steer actuators 15 in a preventive or curative fashion. By way of example, the electronic controller may receives input from measurement devices such as a wheel speed sensor, vehicle direction; gear position; steering angle, steering speed (deflection), steering force; steering angle rear wheels, rear wheel torque (engine control unit; transmission control unit); tilt angle, yaw sensor—preferably placed close to the center of gravity. As output, servo control is provided for the rear wheel steering actuators 15.

In addition to traction, in an embodiment, each wheel (front; resp rear wheels) can be controlled individually with specific torque control control.

Figure 4:
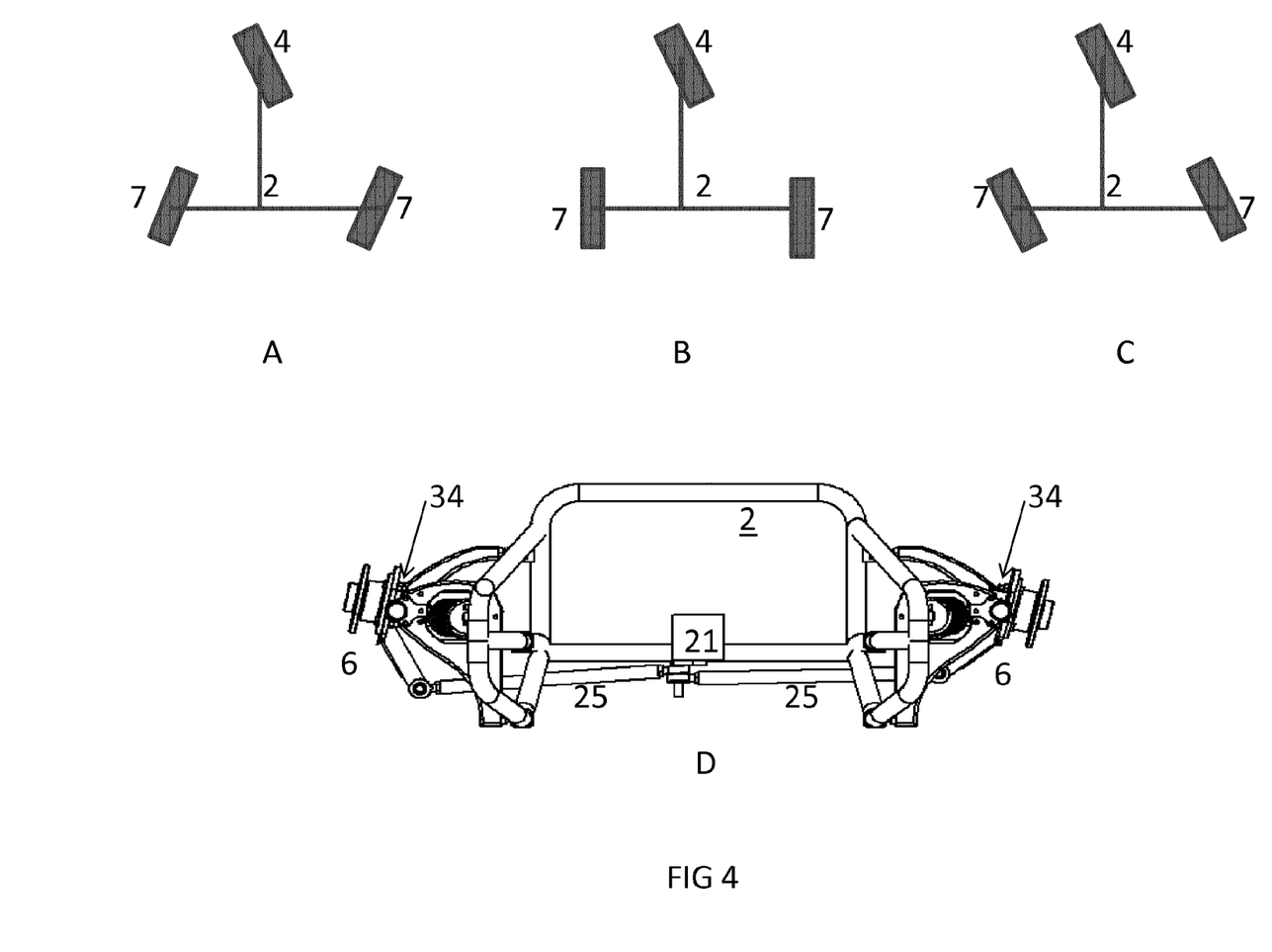
FIG. 4 schematically shows a segmented steering control of the electronic controller.

FIG. 4 schematically shows a segmented steering control of the electronic controller in dependence of vehicle velocity. For example when the vehicle drives at a lower speed, e.g. between 0 to 30 km/h (See FIG. A), the controller is programmed to steer the rear wheels 7 in counter direction of the front wheels 4 and independent of the tilting of the tiltable front frame 2. In this way stability and safety are enhanced. An additional advantage is that maneuvering is improved and it is possible to carry out a small turning circle. At middle speeds (See FIG. B) for example between about 30 to 80 km/h the controller is programmed to steer the keep the rear wheels in neutral position during taking of a curve, that is to say that the rear wheels do not co steer in the steering direction of one of the front wheels and/or the tilting front frame. In a speed segment above 80 km/h (FIG. C) the controller is programmed to co steer the rear wheels in the direction of the front wheels i.e. in reverse direction relative to the low speed phase. An electronic controller programmed to provide rear wheel steer actuation in a segmented fashion relative to vehicle speed and being independent of the steering actuation of the improves safety and driver comfort.

FIG. D shows an exemplary linkage 25 to provide for a the rear wheel steering. In this example the linkage 25 simultaneously engages on both wheel mounts 6, although independent control is also possible. The linkage 25, in this example, is controlled from an actuator unit 21 mounted centrally, that transmits a rotary movement via linkage 25 to the rear wheel mounts 6 thus rotating over a vertical axis 34.

According to a further aspect there is provided a three-wheeled vehicle, comprising: a single front wheel; two rear wheels; a passenger cabin; an electronic controller comprising one or more control modules; a steering input device configured to send an electronic signal to the electronic controller corresponding to an input received at the steering input device associated with steering input of the three-wheeled vehicle; a braking input device configured to send an electronic signal to the electronic controller corresponding to an input received at the braking input device associated with intended braking of the three-wheeled vehicle; a tilting input device configured to send an electronic signal to the electronic controller corresponding to an input received at the tilting input device associated with intended turning of the three-wheeled vehicle; wherein the electronic controller is configured to receive a steer signal indicating counter-steer of the front wheel, wherein the counter-steering and/or front wheel steering angle and or rear wheel steering angle and/or vehicle speed and/or tire pressure initiates or prevents leaning of the passenger cabin a direction of intended turning of the three-wheeled vehicle; wherein the electronic controller is configured to brake the front wheel in response to receiving the electronic signal; wherein the electronic controller is configured to increase or decrease braking of the rear wheels individually in response to receiving the electronic signal from the electronic controller wherein the electronic controller is configured to increase or decrease the rotation and/or torque and/or slip and or turning of the rear wheels individually in response to receiving the electronic signal electronic controller; wherein the electronic controller is configured to steer the rear wheels in response to receiving the electronic signal. According to an aspect rotation of the wheels are controlled at predetermined speeds corresponding with different degrees of leaning of the passenger cabin. The three-wheeled vehicle may further comprise a single, double or rotary actuator arm coupled to the front wheel configured to steer the front wheel in response to signals received from the electronic steering control unit. The rear wheels may be electronically, hydraulically or mechanically coupled to the passenger cabin and are configured to steer the rear wheels in the intended direction of turning of the three-wheeled vehicle in accordance with the leaning of the passenger cabin. The rear wheels may be independent from the cabin and are controlled by the electronic controller, wherein the direction of turning of the rear wheel depends on the vehicle speed, the direction of turning of the vehicle and of stability control module. The rear wheels may be wirelessly coupled to the passenger cabin and are configured to steer the rear wheels in the intended direction of turning of the three wheeled vehicle in accordance with the leaning of the passenger cabin. Actuator arms may be coupled to the rear wheels, wherein the actuator arms or are configured to steer the rear wheels in the intended direction of turning of the three-wheeled vehicle. A rotary actuator or two rotary actuator arms may be coupled to the rear wheels and configured to steer the rear wheels in the intended direction of turning of the three-wheeled vehicle. A single or rotary actuator arms can be independently coupled to each of the rear wheels and configured to steer the rear wheels in the intended direction of turning of the three-wheeled vehicle. In the three-wheeled vehicle, the actuator arms can be configured to steer the rear wheels in the intended direction of turning of the three-wheeled vehicle based on steering signals and wheel speed signals received from the electronic controller. The rotary actuator may be configured to steer the rear wheels proportionally and gradually in the intended direction of turning of the three-wheeled vehicle based on steering and wheel speed signals received from the electronic controller. The actuator arms can be configured to steer each of the rear wheels of the three-wheeled vehicle individually in the intended direction of turning and based on steering signals and wheel speed signals received from the electronic controller. The three-wheeled vehicle may further comprise continuously variable tilting system. The three-wheeled vehicle may further comprise at least one or more actuator arms to tilt the cabin The three-wheeled vehicle may further comprising at least two or more actuator arms to tilt the cabin. One or more of the actuator arms may function as a back-up actuator arm when one or more other actuator arms fail. At least one of the actuator arms can be actuated electrically. At least one of the actuator arms can be actuated hydraulically or pneumatically. A stability control unit may be provided coupled to the rear wheels and configured to receive stability control signals from electronic controller. The stability control unit may be configured to act on the tilt angle and tilting actuator force to prevent roll over to act on the braking repartition (front & rear, left & right) and to send signal to a torque vectoring controller to adjust the yaw rate of the three wheeled vehicle. The stability control unit may be configured to increase or decrease the slip of an inner rear wheel and/or outer rear wheel and/or front wheel and/or front wheel relative to the direction of turning of the three-wheeled vehicle. A torque vectoring controller may be configured to provide the requested yaw rate by adapting the torque at each rear wheel. The stability control unit may be configured to increase or decrease the torque of an outer rear wheel and/or front wheel relative to the direction of turning of the three-wheeled vehicle. A steering column may be provided coupled to the steering input device; and at least two redundant actuators integrated in the steering column and configured to detect steering direction intent and torque input of the steering input device. The steering column may be coupled to the steering input device; and at least two redundant actuators integrated in the steering wheel and configured to detect steering direction intent and torque input of the steering input device. Understeer or oversteer may be synchronized with the rear wheel steering. Threshold speed ranges may be linked to rear wheel steering, tilting of the cabin, and counter torque registered on the front wheel. The control system may initiate actuation of the tilting actuators of the cabin. Leaning of the tilting cabin may be controlled by inputs received by an steering input device and/or at least one other input device. The another input device may comprises one or more lateral acceleration sensors The other input device may comprise one or more speed sensors The other input device may comprise one or more jaw sensors. The other input device comprises one or more optical devices. The other input device may comprise one or more torque sensors. The other input device may comprise one or more artificial horizon sensors. The other input device may comprise one or more pressure sensors. Electronic signals can be sent from the steering input device and/or one or more other input devices to the electronic control unit. The steering input device may comprise a hand-wheel, a joystick, controller or external input for controlling autonomous driving. The controller may be programmed to bring, keep and lock the body of the vehicle in a upright position, when the vehicle is moving at low speed or when it is turned off. Low speed may be below 10 kph. While driving, the controller can be programmed to tilt the cabin to an upright position substantially without lateral accelerations. A natural lateral acceleration may be simulated by using the input measures of one or more sensors. One of the sensors can be a sensor which measures lateral acceleration of the drivers body. The tilting control may be in function of the vehicle lateral acceleration sensor and/or speed sensor and/or steering angle sensor and/or steering torque sensor and/or artificial horizon sensor and/or drivers body lateral acceleration sensor and/or pressure sensors sensor and/or jaw sensors and/or external radio signals. The control of the tilting may insure a limited rear tire contact patch load variation while cornering in order to guarantee a good stability of the vehicle. An electronic control unit may comprise an ESP (electronic stabilization program)/ASR (Traction) control unit configured to receive an electronic signal associating with wheel speed of one or more wheels and/or brake status (front and rear pressures) and/or the steering angle and/or the steering angles of one or more of the 3 wheels and/or the torque at the rear wheels: (transmission torque (or engine torque combined with transmission ratio)+ differential locking ratio) or (torque of each emotor) and/or the yaw rate and/or the tilting angle (for the centre of gravity position) and/or accelerometers (A_XY). The ESP/ASR control unit may be configured to decrease the rotation, torque or slip of an inner rear wheel and/or rotation, torque or slip of the outer rear wheel and/or front wheel relative to the direction of turning of the three-wheeled vehicle. The ESP/ASR control unit can be configured to increase the rotation, torque or slip of one or more rear wheels and or front wheel relative to the intended direction of turning of the three-wheeled vehicle.

The form of the chassis can be varied to achieve a desired appearance such variations are deemed to lie within the bred and scope protections of the claims.

The invention claimed is:

1. A vehicle comprising:
a front frame with a seat for at least one person and a front wheel mounting for at least one front wheel;
a back frame with a rear wheel mounting for at least two back wheels; which front frame is connected via a rotary axis with the back frame, the rotary axis having a component parallel to the longitudinal direction of the vehicle;
a drive arrangement that engages at least one of the wheels;
a steering arrangement for rotating at least one front wheel relative to the front frame, over a rotation axis with a vertical component; and
wherein the rear wheel mounting includes rotatable mounting members for mounting the rear wheels, the mounting members rotatable about a rotation axis with a vertical component, wherein one or more rear wheel steering actuators drive the mounting members to provide steering actuation; and
a tilt actuator configured to control a tilt position of the front frame relative to the rear frame, which is independent of the steering actuation provided by the one or more rear wheel steering actuators.

2. The vehicle according to claim 1, wherein the tilt actuator is an electronic, hydraulic or electrohydraulic tilt actuator.

3. The vehicle according to claim 1, wherein the tilt actuator comprises at least a hydraulic cylinder, wherein the front frame includes an arm that engages the hydraulic cylinder, which arm controls a rotary position of the front frame relative to the back frame.

4. The vehicle according to claim 1, wherein the tilt actuator comprises an electromotor.

5. The vehicle according to claim 1, wherein the tilt actuator is connected to at least one measurement device that is configured to detect vehicle or surroundings information.

6. The vehicle according to claim 1, wherein the tilt actuator comprises an oscillation detection circuit configured to detect oscillation and to provide active damping in response to oscillation detection.

7. The vehicle according to claim 1, wherein the one or more rear wheel steering actuators comprise at least one of a hydraulic cylinder and an electric driven tooth wheel arrangement.

8. The vehicle according to claim 7, wherein the hydraulic cylinder or the tooth wheel arrangement is arranged anti-parallel to the mounting members.

9. The vehicle according to claim 1, wherein the mounting members include arms coupled via a link assembly.

10. The vehicle according to claim 1, wherein the rear wheel steering actuators comprise an electromotor configured to provide rotation of the mounting members about respective rotation axes.

11. The vehicle according to claim 1, wherein the front frame has a steering axis that is substantially parallel to the rotation axis of the mounting members, which steering axis tilts with tilt movement of the front frame, wherein the front frame includes a transmission device for transmitting tilt of the steering axis to turning of at least one front wheel for steering of the vehicle.

12. The vehicle according to claim 1, further including one or more measurement devices and an electric controller, wherein the electric controller is configured to receive electronic measurement signals from one or more of the measurement devices and to actuate the rear wheel steering actuators in response to receipt of the electronic measurement signals.

13. The vehicle according to claim 12, wherein the one or more measurement devices are configured to detect vehicle information or surroundings information.

14. The vehicle according to claim 13, wherein the vehicle information comprises at least one of vehicle speed, vehicle direction, steering angle, steering force, counter steer feedback, rear wheel steering actuator position, rear wheel steer force and tilt of the front frame.

15. The vehicle according to claim 13, wherein the surroundings information comprises at least one of road condition, road angle relative to the horizon, a weather condition, a traffic sign and an obstacle, wherein the one or more measurement devices comprise at least one of a satellite controller and an electronic controller.

16. The vehicle of claim 5, wherein the at least one measurement device comprises a vehicle speed sensor configured to match a torque stiffness of the tilt actuator to a vehicle speed.

17. The vehicle of claim 7, wherein the electric driven tooth wheel arrangement comprises a tooth wheel rack mounted on an arm of at least one of the mounting members, wherein the arm controls a rotary position of at least one of the mounting members.

* * * * *